Patented Aug. 11, 1931

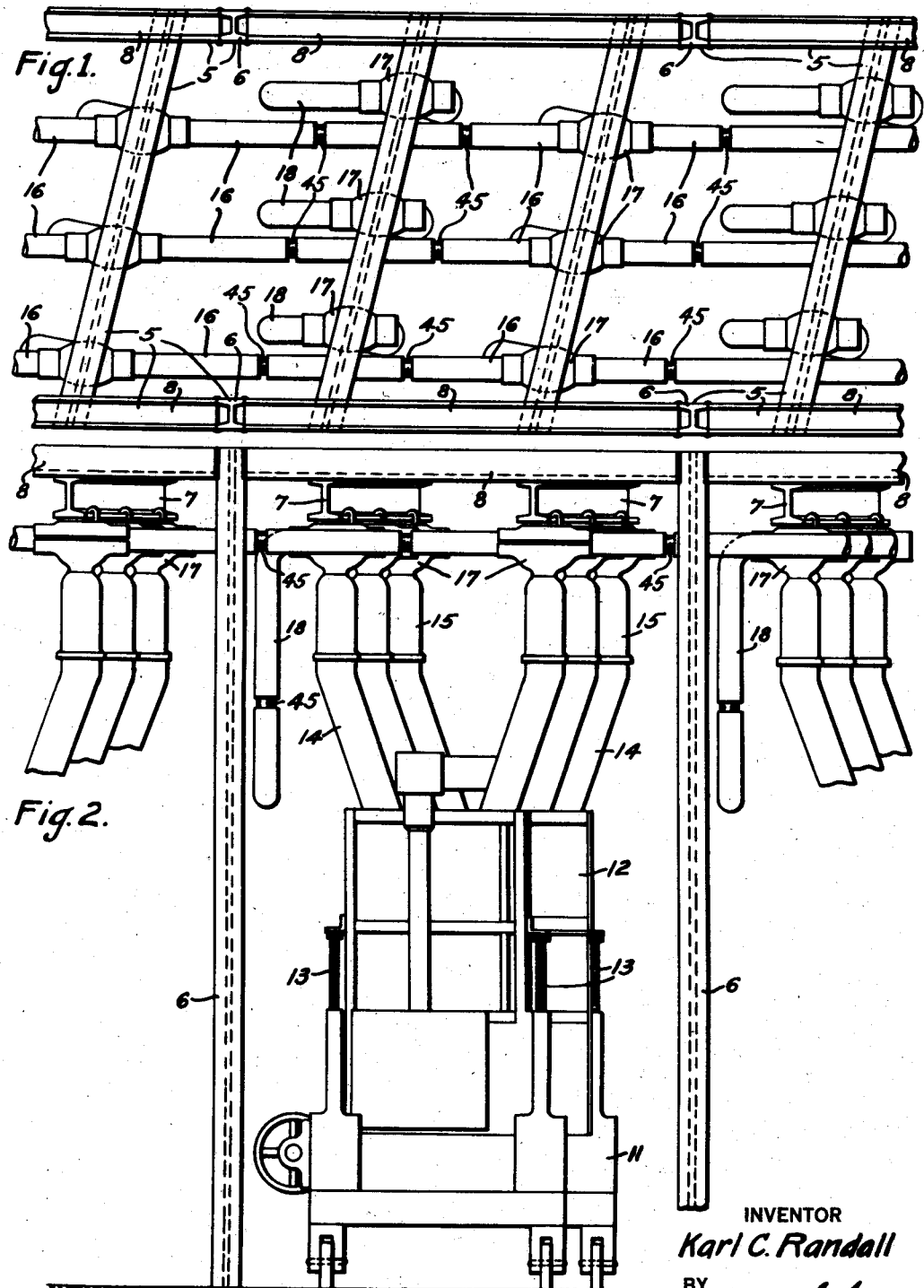

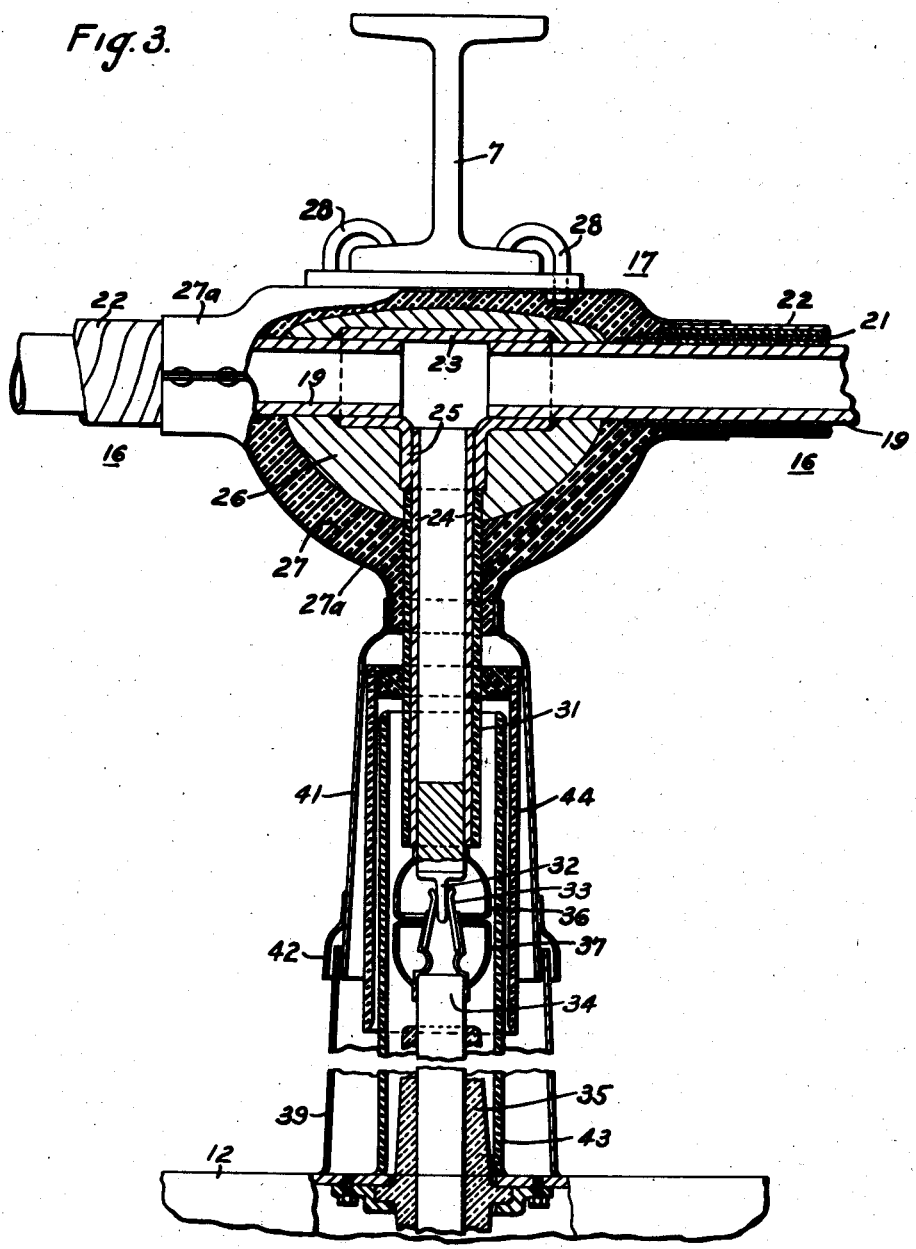

1,818,160

UNITED STATES PATENT OFFICE

KARL C. RANDALL, OF EDGEWOOD, PENNSYLVANIA, ASSIGNOR TO WESTINGHOUSE ELECTRIC & MANUFACTURING COMPANY, A CORPORATION OF PENNSYLVANIA

CURRENT DISTRIBUTING APPARATUS

Application filed March 3, 1928. Serial No. 258,865.

My invention relates to current distributing apparatus and particularly to switching apparatus of the metal clad type.

An object of my invention is to provide a current distributing apparatus wherein the circuit breaker is mounted upon a truck and is provided with exteriorly extending disconnecting switch contacts that are adapted to engage stationary disconnecting switch contacts that are connected to insulated bus bars or cables.

A further object of my invention is to provide a current distributing system where a plurality of circuit breakers of the type referred to are disposed in separate cells and wherein the stationary disconnecting switch contacts connected to the buses or cables are disposed in the same horizontal plane, and in such manner that the feed buses and the distributing buses occupy the same horizontal plane, thus enabling the use of circuit breaker disconnecting switch contacts of uniform size and construction.

A further object of my invention is to provide a current distributing apparatus wherein the disconnecting switch contacts connected to the bus bars are suspended from an overhead structure and wherein the feed cables may be made in sections and joined by the disconnecting switch contact device and supported thereby.

A further object of my invention is to provide a circuit distributing apparatus wherein standard lengths of insulating buses or cables may be provided and which may readily be assembled in the field to connect a plurality of separate circuit breaker units with a feed circuit and with a plurality of distributing circuits.

A further object of my invention is to provide current distributing apparatus having the above noted characteristics wherein the circuit breaker apparatus is enclosed within a metal casing that is grounded and wherein the buses are covered with insulation and enclosed within an external metallic covering that is grounded or connected to the grounded circuit breaker casing, thereby enabling the placing of the buses in relatively close relation and thereby reducing the space required for bus bars and circuit breaker terminals.

A further object of my invention is to provide a metal enclosed current distributing apparatus, wherein the metal casing surrounding the buses is divided into sections that are insulated from one another for eliminating closed circuits for eddy currents.

A further object of my invention is to provide a branch line disconnecting switch contact connection that serves to permanently join two bus sections and at the same time provide a branch line connection for supporting a disconnecting switch contact.

A further object of my invention is to provide a disconnecting switch contact that is provided with means for preventing corona in the vicinity of the disconnecting switch contacts and thereby reducing the space required between the disconnecting switch contacts.

These and other objects that will be made apparent throughout the further description of my invention are attained by means of the current distributing apparatus hereinafter described and illustrated in the accompanying drawings wherein:

Figure 1 is a top plan view of a circuit breaker cell showing the bus bar system and the cell structure.

Fig. 2 is a transverse section through the circuit breaker cell shown in Fig. 1, showing the bus bar system and the circuit breaker in side elevation, and Fig. 3 is a vertical section through a fragment of a bus bar connection and a disconnecting switch associated therewith.

Referring to the drawings, the apparatus includes a fabricated steel frame structure 5 having vertical supporting columns 6. The cross beams 7 are suspended from the longitudinal beams 8 and serve to support bus connections and terminals in a manner to be hereinafter described.

The circuit breaker 12 is mounted upon jack screws 13 carried by the truck 11 and which are simultaneously raised and lowered by suitable mechanism for moving the circuit breaker 12 vertically in order to bring the circuit breaker disconnecting switch contact members 14 into engagement with the stationary disconnecting switch contact devices 15, that are suspended from the beams 7, in a manner hereinafter described.

The incoming feed cables 16, which will be hereinafter more specifically described are arranged in a horizontal plane and extend longitudinally of the supporting structure 5 as indicated in Figures 1 and 2. The cables 16 are made in sections, the length of which is determined by the center to center distance between adjoining cells and as indicated in Figs. 1 and 3, the sections being joined by means of connection devices 17 that support the disconnecting switch contact devices 15.

The circuit breakers 12 may be of the usual construction having, in the case of a three-phase circuit breaker two parallel rows of disconnecting switch members 14. In order that the disconnecting switch devices 15 may be mounted in the same horizontal plane, the disconnecting switch devices connected with the distributing buses 18 are offset with respect to the disconnecting switch devices connected to the buses 16, as indicated in Fig. 1.

In order that the disconnecting switch members 14 register with the disconnecting switch devices 15 the circuit breaker 12 is mounted diagonally on the truck 11. By reason of this arrangement of the disconnecting switch devices 15, the upper bent ends of the distributing buses 18 extend in the same plane as the buses 16, thus conserving over-head space, and since all of the disconnecting switch devices 15 are in the same plane, the disconnecting switch members 14 are of equal length and will simultaneously engage the devices 15 when the circuit breaker is elevated to its operative position shown in Fig. 2.

Referring particularly to Fig. 3 wherein a bus connection 17 and disconnecting switch contact device is shown, each feed bus section 16 comprises a copper tube 19 that is surrounded with insulating material 21, such as is usually provided about conducting cables, the insulating material being covered by a metallic sheath 22 that may be of any preferred construction.

The adjacent ends of the bus bar sections are joined by means of a copper pipe-T 23 in which the ends of the tubes 19 are inserted and joined thereto by soldering or welding. A branch terminal tube 24 is also inserted in the branch connection 25 of the pipe-T 23 and is soldered or welded thereto. After the ends of the bus sections are thus joined and the branch terminal tube 24 is assembled, the joint thus made is permanently sealed by casting a solder block 26 about the pipe-T, as indicated in Fig. 3. Thus a good permanent conducting joint is established between sections of the bus and the branch connections and sharp corners are eliminated from the connection. The joint is then insulated by either wrapping insulating tape about it or by molding thereabout, a block of insulating material 27 having a predetermined external shape, as indicated in Fig. 3, the insulating material extending over the tapered insulating material 21 surrounding the tubes 19, thus entirely covering the exposed ends of the tubes.

A divided metallic covering 27a surrounds the insulating material 27 and is joined to the metallic covering 22 of the bus section 16, as indicated in Fig. 3. The casing 27a is provided with clamps 28, by means of which, the connection 17 may be secured to and suspended from the beam 7 of the supporting structure.

The branch terminal tube 24 is surrounded by an insulating tube or bushing 31 and is provided at its outer end with a contact member 32 that is adapted to be engaged by by yielding contact jaws 33, mounted on a contact terminal 34 that is connected to a contact of the circuit breaker 12 and which is supported in an insulating bushing 35 secured to the casing of circuit breaker 12.

It has been found that disconnecting switch terminals having relatively high potentials, imposed thereon, have a tendency to arc across from one contact member to that of neighboring contact members due to the expansion of the corona and consequent failure of the air insulation where the contact terminals are exposed to the atmosphere. In order to prevent or reduce the corona to a minimum, the contact members are surrounded by metal bells 36 and 37 that are mounted, respectively, on the contact member 32 and the terminal 34. Since no sharp corners are presented exteriorly of the bells, corona is prevented or its formation is minimized.

The circuit breaker casing 12 is provided with a metal tube 39 that surrounds the terminal 34 and this tube telescopes over a tube 41 that is connected to the casing 27, as indicated in Fig. 3. An annular apron 42 covers the upper end of the cylinder 39 and prevents moisture condensing on the exterior of the cylinder 41 from flowing into the cylinder 39.

In order to insulate the bell 36 from the metal telescoping cylinders 39 and 41, an insulating tube 43 is secured to the casing of the circuit breaker 12, and surrounds the bells and contact members, and telescopes into an insulating tube 44, that is secured to the insulating bushing 31. By reason of this arrangement, the contacts are adequately insulated from the metal protecting cover and the construction is such that the contacts are shielded from external objects when they are separated. In order to prevent heating of the metal bus covering and the circuit breaker casing, due to eddy currents, the metal bus covering is interrupted at points 45 between connections, in such manner that no closed circuits for eddy currents are eliminated.

While I have illustrated but two embodiments of my invention, it will be apparent to those skilled in the art that various changes, modifications, substitutions, additions and omissions may be made in the apparatus illustrated without departing from the spirit and scope of my invention as set forth in the appended claims.

I claim as my invention:

1. In a polyphase current distributing system, a plurality of stationary disconnecting switch contact members mounted in two parallel rows and having bus connections all disposed in the same plane, the said contact members being adapted to engage similarly arranged co-operating contact members of a circuit breaker, feeder buses disposed in the plane of the connections and connected to the connections of one row of contact members and distributing buses having a portion extending in the said plane and connected to the connectors of the other row of contact members.

2. A current distributing system comprising an over-head supporting structure having parallel arranged horizontal beams, each supporting a row of disconnecting switch contact members having bus connections all in the same plane, and straight parallel buses disposed in the plane of the connections and angularly with respect to the line of connections in each row whereby the buses connected to connections of contact members of one row may extend past connections of another set of buses without interference.

3. In a polyphase current-distributing system, a plurality of stationary disconnecting-switch contact members arranged in pairs and mounted in two parallel rows, the contacts of each pair being in different rows and having connections all disposed in the same plane, straight parallel-disposed buses one for each connection of each row of contact members, disposed in the plane of the said connections and at an angle to a line connecting a pair of contact members, whereby one set of buses may extend past the connections of another set of buses without interference.

In testimony whereof, I have hereunto subscribed my name this 27th day of February, 1928.

KARL C. RANDALL.